United States Patent [19]

Young

[11] Patent Number: 4,675,896

[45] Date of Patent: Jun. 23, 1987

[54] REMOTE MONITORING APPARATUS

[75] Inventor: David G. Young, Aurora, Colo.

[73] Assignee: The Mountain States Telephone and Telegraph Company, Denver, Colo.

[21] Appl. No.: 773,253

[22] Filed: Sep. 6, 1985

[51] Int. Cl.⁴ .............................................. H04M 3/28
[52] U.S. Cl. .......................................... 379/34; 379/1; 324/65 R; 340/517; 340/653
[58] Field of Search ......... 179/175.2 C, 175, 175.2 R, 179/2 A, 2 DP, 5 R, 5 P; 324/65 R, 71.1; 340/506, 510, 517, 521, 635, 650, 652, 653

[56] References Cited

U.S. PATENT DOCUMENTS

| | | | |
|---|---|---|---|
| 3,105,882 | 10/1963 | Meyer | 179/175.3 |
| 3,105,883 | 10/1963 | Higson, Jr. | 179/175.3 |
| 3,259,892 | 4/1966 | Winckelmann | 340/242 |
| 3,268,867 | 8/1966 | Pickett et al. | 340/152 |
| 3,444,336 | 4/1969 | Holt et al. | 179/175.3 |
| 4,310,835 | 1/1982 | Sefton | 340/533 X |
| 4,491,828 | 1/1985 | Galvin et al. | 340/525 X |

Primary Examiner—Stafford D. Schreyer
Attorney, Agent, or Firm—Fields, Lewis, Pittenger & Rost

[57] ABSTRACT

A determination of the extent and location of malfunctions in electrical equipment is made by providing monitoring apparatus at the equipment which includes a resistance network that provides a different resistance each time a switch changes state and an output corresponding to that change that can be monitored from a remote location. The remote monitor disclosed is a programmed computer with a modem coupled to the monitoring apparatus by phone lines and also coupled to an output device by phone lines whereby the computer can readily transmit malfunction information to the output device at various maintenance center locations.

3 Claims, 2 Drawing Figures

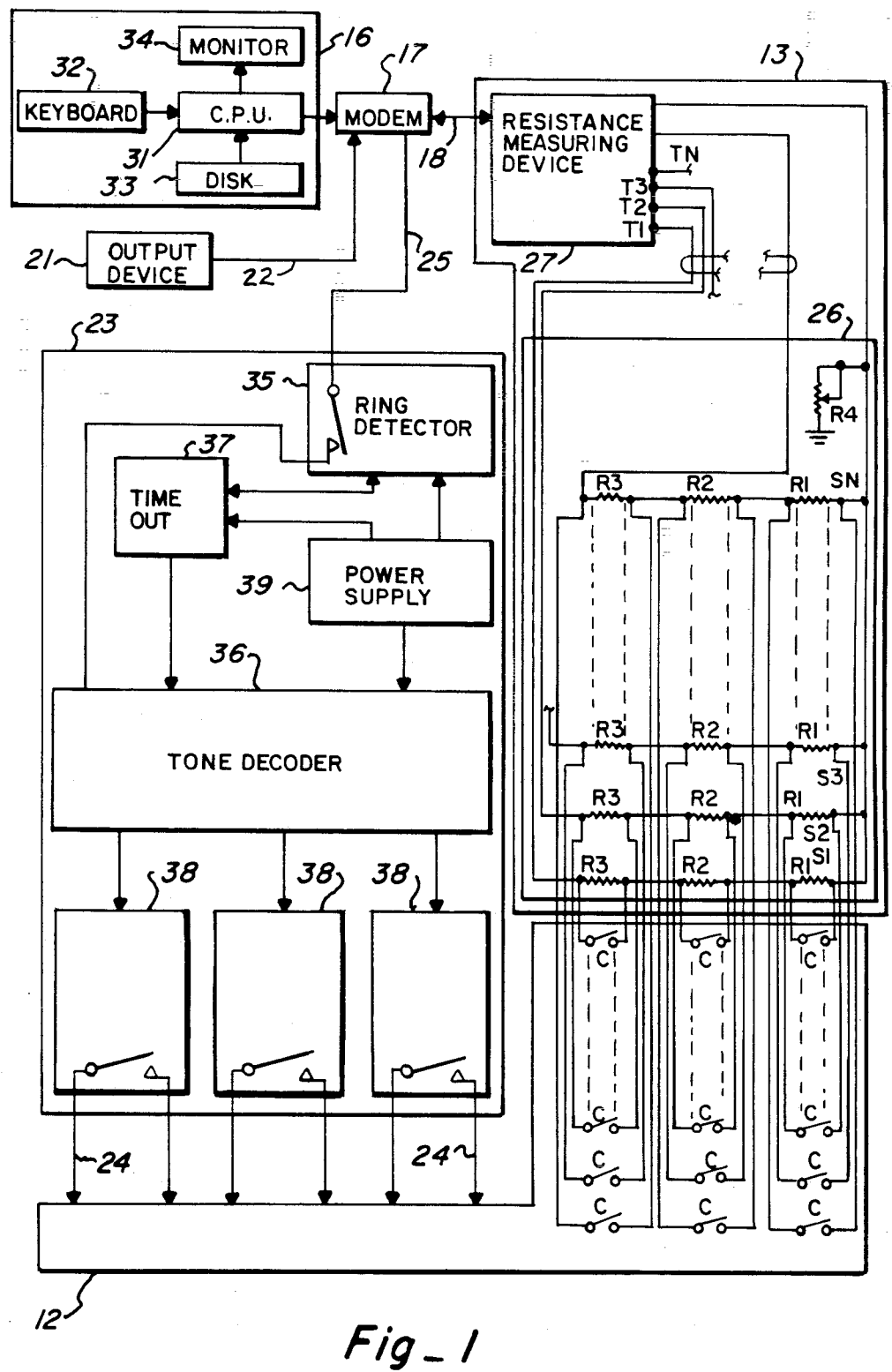
Fig_1

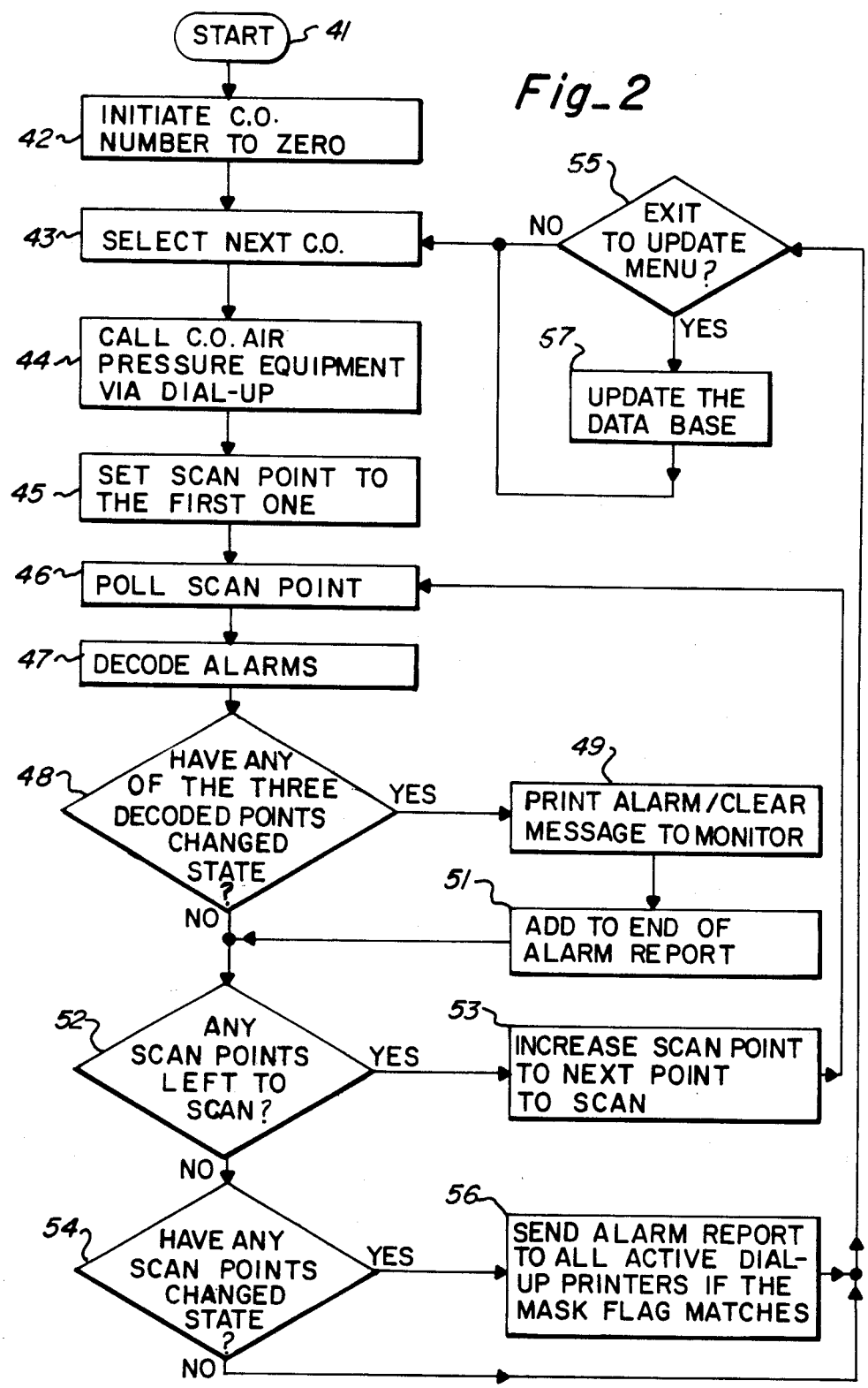
Fig_2

REMOTE MONITORING APPARATUS

TECHNICAL FIELD

This invention relates to monitoring the operation of electrical equipment and more particularly to monitoring apparatus that is especially suited for indicating a malfunction in electrical equipment such as telephone equipment that is operable from a central station remote from such equipment.

BACKGROUND ART

Electrical equipment of various types is subject to a variety of types of malfunctions. Currently with central office telephone equipment there is a considerable time delay before malfunctions are detected. There is a further time delay and considerable effort is expended to locate, identify and correct malfunctions in telephone equipment after it is determined that a malfunction has occurred.

Presently, once it is determined that a malfunction has occurred, the practice is to dispatch a troubleshooter to a particular area without being certain as to the exact location or precise nature of the problem. The apparatus of the present invention overcomes a number of these problems by continuously monitoring the operation of electrical equipment and, when a malfunction occurs, information concerning the type of malfunction and location of the malfunction is transmitted back to a central location from which a repair person can be dispatched to make the repair.

There are no known remote monitoring systems that can monitor SLC 96 telephone equipment alarms other than stand alone microprocessors and these would involve considerable cost.

Pickett U.S. Pat. No. 3,268,867 discloses a system for centrally monitoring a number of remote positions such as telephone systems but this monitors pressure at selected remote points and requires two-wire conductor pairs along the cable and does not employ a resistance network to sense the state of change of different switches.

U.S. Pat. Nos. 3,105,882, 3,105,883, 3,259,892 and 3,444,336 disclose remote monitoring of the pressure conductor in a pressurized cable.

DISCLOSURE OF INVENTION

In accordance with the present invention there is provided apparatus for monitoring the operating conditions of electrical equipment. This monitoring apparatus includes a resistance network at the equipment that provides a different resistance value each time a different switch changes state. Each switch is activated by some part of the electrical equipment being monitored. A resistance measuring device readable from a remote location is connected to the resistance network. A computer is used to continuously scan the measured resistance via the phone lines. Information pertaining to the type and location of the malfunction may be made available in a written form using a teleprinter coupled to the computer via telephone lines.

BRIEF DESCRIPTION OF DRAWINGS

The details of this invention will be described in connection with the accompanying drawings, in which:

FIG. 1 is a diagram showing remote alarm monitoring apparatus embodying features of the present invention; and FIG. 2 is a flow chart of the program for the microcomputer for determining the current alarm status of the electrical equipment being monitored.

DETAILED DESCRIPTION

Referring now to the drawings, in FIG. 1 there is shown electrical equipment 12 to be monitored, monitoring apparatus 13 at the equipment, and a microcomputer 16 remote from the monitoring apparatus 13 having a modem 17 that is shown connected to the monitoring apparatus 13 by a telephone line 18.

An output device 21 is shown coupled to the computer through the modem by a telephone line 22. A tone detection circuit 23 is shown connected to the equipment 12 by lines 24 and to the modem 17 by a telephone line 25.

Circuit 23 is used to reset the contacts in equipment 12 when SLC 96 equipment is being used, but it is understood that the basic monitoring of malfunctions by circuit 13 does not require circuit 23. It is further understood that circuit 23 can be used in any application that requires the control of one or more sets of contacts from a remote location.

The monitoring apparatus 13 shown includes a resistance network 26 and a resistance measuring device 27. The resistance network 26 includes a plurality of identical sets of resistors designated S1, S2, S3 and SN. Each set is comprised of three resistors R1, R2 and R3 connected in series with one another. Each set is connected in series with a resistor R4 which is in turn connected to ground. Each set of resistors is connected to a terminal designated T1, T2, T3 and TN, respectively, in device 27.

An electric switch or contact C is connected across each of the resistors of each set. Each contact is operatively associated with various parts of the equipment 12 so that, when a change of operating condition occurs, the contact associated with that change, such as a malfunction, shorts out the associated resistor.

In the preferred embodiment, each network 26 has twenty-three sets of resistors to make a total of sixty nine. The preferred values are: R1=150 K ohms, R2=75 K ohms, R3=39 K ohms and R4=101 K ohms.

The resistance measuring device 27 in the embodiment shown and described herein is air pressure monitoring equipment presently available to the telephone company. A Spartan 5310 is described in the illustrated embodiment so that device 27 is also referred to herein as air pressure equipment.

Device 27 measures the resistance at the terminals T1, T2, T3 and TN. Each closure of each contact C will provide a different resistance measurement from the terminals of network 26. The Spartan 5310 air pressure equipment converts the resistance measurement to a related air pressure readout that can be interrogated from a remote location.

While it is understood that the particular air pressure equipment described herein converts the resistance measurement to an air pressure readout, such conversion is not necessary and the only requirement for device 27 is that it will continuously measure electrical resistance and that measurement can be interrogated by the computer 16 from a remote location.

In a typical installation the equipment 12 is the central office of a telephone company where dial tones are generated. The apparatus 13 and circuit 23 would be on a printed circuit board and one or more circuit boards would be connected to the equipment, there being 69 contacts per board. A single computer 16 would be located at a dispatch center remote from the central office.

One or more output devices 21 would be located at various maintenance centers remote from either computer 16 or equipment 12. Any alarm information would be transmitted from apparatus 13 to the modem 17 by phone line 18 and the information then transmitted from the computer to the appropriate output device by phone line 22.

The computer 16 is shown to have a central processing unit (CPU) 31, a keyboard 32, a disk 33, and a monitor 34. A Kaypro 10 microcomputer was used in the practice of the present invention. The output device 21 preferably is a teleprinter with telephone dial access.

The tone detection circuit 23 includes a ring detector 35 which monitors the telephone line 25 and, if an incoming call is ringing, will answer the call and connect a tone decoder 36 to the telephone line. When signaled by a time-out circuit 37, the ring detector will automatically disconnect the phone line. The time-out circuit has two separate electronic timers, one to control the ring detector 35 and one to control relays 38 through the tone decoder.

The tone decoder 36 listens to the touch tones from the calling telephone and turns on or off a selected of the relays 38. If a particular code is sent, the relays 38 are used to turn something on externally of the tone detector circuit, which in the present application is the operation of auxiliary test modes in the SLC 96 telephone equipment.

A power supply 39 is used to provide power to each of the above ring detector, time-out, and tone decoder circuits.

In practice when the equipment above described is used it is preferred to mount network 26 and circuit 23 on a common circuit board.

In general, the software of the computer determines whether or not an alarm condition has taken place and provides a message that is transmitted to the output device 21.

Referring now to FIG. 2, the flow chart of the program for the microcomputer for determining the current alarm status begins with a block 41, designated START, indicating the loading of the software from the hard disk drive into the memory of the CPU 31. Block 42, designated INITIATE C.O. NUMBER TO ZERO, indicates that the initial pointer to the central office number has been set to zero. "C.O" is the abbreviation for "CENTRAL OFFICE."

Block 43, designated SELECT NEXT C.O., controls an increase of the central office number from its current state by one and looks to make sure that the central office is active and is to be polled. If not, block 43 will keep increasing until it finds the next available central office.

In this state of just turning it on, the central office number will be zero so that block 43 will increase to one. Each successive loop will be increased by one at this point until it reaches a maximum of thirty and then it is reset back to one again.

Once that has been done, it goes back to the next block 44, designated CALL C.O. AIR PRESSURE EQUIPMENT VIA DIAL-UP. The modem dials the telephone number associated with the air pressure equipment, makes connections, and interrogates that equipment. The interrogation process is broken down into the next several blocks.

The first block 45, designated SET SCAN POINT TO THE FIRST ONE, looks at individual scan points on the air pressure equipment 27. Block 46, designated POLL SCAN POINT, gets the reading back from the air pressure equipment as to its current status. Since there are sets of three resistors in the resistance network 26 that encode the switch contacts to indicate an alarm state, there is shown a block 47, designated DECODE ALARMS, decoding into those three separate switch contacts based upon the resistance reading.

At this point there is a decision made in block 48, designated HAVE ANY OF THE THREE DECODING POINTS CHANGED STATE? If there is a YES on any of the three, the computer will then print an alarm message, as indicated by block 49, designated PRINT ALARM MESSAGE TO CRT, as well as by block 51, designated ADD TO END OF ALARM REPORT. On the other hand, if the answer to the question in block 48 is NO, the next decision indicated in block 52, designated ANY SCAN POINTS LEFT TO SCAN? means that the CPU has completed its scan of all the program switches in that office.

Any time a switch C changes state (closes), there will be a message transmitted to the output device 21 resulting in an alarm report. This first message is followed by a second message indicating the closed switch has opened and a clear message is transmitted to output device 21.

If the answer to block 52 is YES, and there are remaining points to be scanned, then, as indicated by block 53, designated INCREASE SCAN POINT TO THE NEXT POINT TO SCAN, the scan point is increased to the next available one and this information is stored in the data base.

A line is showing between block 53 and block 46 indicating that information goes back up and repeats the previous poll scan point of block 46 down to this decision until all points have been scanned.

Once all points have been scanned, the answer to the question of block 52 will be NO and it drops down and makes the decision of block 54, designated HAVE ANY SCAN POINTS CHANGED STATE?

If the answer from block 54 is NO, there is a connection to a block designated EXIT TO UPDATE MENU, which is the last remaining section of the program. If the answer is NO, it simply goes around and checks to see if an escape to the update menu is requested, then back to the SELECT NEXT C.O. and continues this continuous loop until it is either shut off or loses power.

If the answer to the question of block 54 is YES, it will then send to a block 56, designated SEND ALARM REPORT TO ALL ACTIVE DIAL-UP PRINTERS IF THE MASK FLAG MATCHES, and the output of this is connected back to block 55.

A final block 57, designated UPDATE THE DATA BASE, is coupled to the YES output of block 55. If the answer from the EXIT TO UPDATE MENU is YES, the monitoring of alarms is stopped and goes to a complete menu to allow updating, changing, or adding to any portion of the base any additional information describing alarms for phone numbers or any other information needed to make it work and it returns back into the monitoring mode.

The invention has been described in detail with particular reference to preferred embodiments thereof, but it will be understood that variations and modifications can be effected within the spirit and scope of the invention.

What is claimed is:

1. Remote alarm monitoring apparatus for checking telephone equipment at a central office from a remote operator's station comprising:
   a resistance network at the telephone equipment including a resistor associated with a switch connected to telephone equipment, each said switch changing in state to indicate an alarm condition such as a malfunction, said network including a plurality of identical sets of resistors;
   a resistance measuring device coupled to said terminals of said network for continuously measuring the resistance of said network and providing a readable output indicating a particular switch has changed state;
   a tone detection circuit coupled to said modem by a telephone line to reset the switch contacts in said equipment being monitored after each malfunction has been detected;
   a programmed microcomputer at an operator's station remote from said resistance measuring device coupled through a modem and a telephone line to said device responsive to said resistance measurement output to provide a first message that a particular malfunction has occurred and a second message that the malfunction has been corrected; and
   a teleprinter at a maintenance center connected to said modem over a second telephone line responsive to said messages to print out said second message.

2. Apparatus as set forth in claim 1 wherein said resistance network and said tone detection circuit are on a printed circuit board located at and connected to said telephone equipment.

3. Remote monitoring apparatus for continuously checking electrical equipment from a remote operator's station comprising:
   a resistance network at the electrical equipment including a resistor associated with a switch connected to the equipment, each said switch changing in state to indicate an alarm condition such as a malfunction, said network including a plurality of identical sets of resistors, each set having three different resistors of different values connected between ground and an output terminal for that set, one of said switches being activated to short out one of said resistors when a malfunction occurs;
   a resistance measuring device coupled to said terminals of said network, said resistance measuring device being provided by air pressure equipment with an electronic ohmmeter for continuously measuring the resistance of said network and providing a readable output indicating a particular switch has changed state; and
   a programmed computer remote from said resistance measuring device coupled through a modem and a telephone line to said device responsive to said resistance measurement output to provide a first message that a particular malfunction has occurred and a second message that the malfunction has been corrected;
   a teleprinter connected to said modem over a second telephone line responsive to said messages to print out said second passage; and
   a tone detection circuit coupled to said modem by a telephone line to reset the switch contacts in said equipment being monitored after each malfunction has been detected.

* * * * *